United States Patent
Sugano

(10) Patent No.: US 11,628,830 B2
(45) Date of Patent: *Apr. 18, 2023

(54) AUTOMATED VALET PARKING SYSTEM

(71) Applicant: Toyota Jidosha Kabushiki Kaisha, Toyota (JP)

(72) Inventor: Tatsuya Sugano, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 356 days.

This patent is subject to a terminal disclaimer.

(21) Appl. No.: 17/015,576

(22) Filed: Sep. 9, 2020

(65) Prior Publication Data

US 2021/0171019 A1 Jun. 10, 2021

(30) Foreign Application Priority Data

Dec. 6, 2019 (JP) .............................. JP2019-221290

(51) Int. Cl.
*B60W 30/06* (2006.01)
*G05D 1/02* (2020.01)
*G05D 1/00* (2006.01)

(52) U.S. Cl.
CPC .......... *B60W 30/06* (2013.01); *G05D 1/0027* (2013.01); *G05D 1/0214* (2013.01); *G05D 1/0274* (2013.01)

(58) Field of Classification Search
CPC ... B60W 30/06; G05D 1/0027; G05D 1/0214; G05D 1/0274
See application file for complete search history.

(56) References Cited

U.S. PATENT DOCUMENTS 6,904,362 B2 * 6/2005 Nakashima ........ G01C 21/3626
                                                701/411
11,250,706 B2 * 2/2022 Hüger et al. ....... B62D 15/0285
(Continued)

FOREIGN PATENT DOCUMENTS

CN        107238814 A    10/2017
CN        110304049 A    10/2019
(Continued)

OTHER PUBLICATIONS

U.S. Appl. No. 17/106,604, filed Nov. 30, 2020 Inventor: Tatsuya Sugano.

*Primary Examiner* — Chico A Foxx
(74) *Attorney, Agent, or Firm* — Dinsmore & Shohl LLP

(57) ABSTRACT

An automated valet parking system acquires a first vehicle location based on a detection result of an in-vehicle sensor of an autonomous vehicle and object information in a parking place, acquires a second vehicle location based on a detection result of a facility sensor provided in the parking place, and determines, based on the first and the second vehicle locations, presence or absence of location fail of the autonomous vehicle with respect to the first vehicle location. The location fail determiner determines that the location fail is present at least in one case out of a case where difference between a first longitudinal location and a second longitudinal location is equal to or greater than a longitudinal threshold or a case where difference between the first and the second lateral locations is equal to or greater than a lateral threshold. The lateral threshold is smaller than the longitudinal threshold.

6 Claims, 7 Drawing Sheets

(56) References Cited

U.S. PATENT DOCUMENTS

| | | | |
|---|---|---|---|
| 2006/0047423 A1* | 3/2006 | Min | G01C 21/30 340/995.19 |
| 2019/0337513 A1* | 11/2019 | Kim | B60W 30/165 |
| 2019/0382002 A1 | 12/2019 | Yamazaki | |
| 2020/0166350 A1* | 5/2020 | Gitz | B60R 1/00 |
| 2020/0307648 A1* | 10/2020 | Noguchi | B62D 15/0285 |
| 2020/0385016 A1* | 12/2020 | Noguchi | B60W 60/001 |
| 2021/0078601 A1* | 3/2021 | Sugano | G08G 1/149 |
| 2021/0086757 A1* | 3/2021 | Sugano | G08G 1/142 |
| 2021/0086759 A1* | 3/2021 | Yamanaka | G06V 20/586 |
| 2021/0331666 A1* | 10/2021 | Meng | G08G 1/168 |
| 2022/0135024 A1* | 5/2022 | Hidaka | G08G 1/00 701/23 |
| 2022/0172623 A1* | 6/2022 | Hidaka | G08G 1/146 |

FOREIGN PATENT DOCUMENTS

| | | | | |
|---|---|---|---|---|
| CN | 114475579 A | * | 5/2022 | |
| JP | 0466348 A1 | * | 1/1992 | G05D 1/0248 |
| JP | 2018-021777 A | | 2/2018 | |
| JP | 2018-147477 A | | 9/2018 | |
| KR | 102228464 B1 | * | 3/2021 | |
| TH | 1801006636 A | * | 8/2019 | B60W 40/06 |
| WO | WO-2018163817 A1 | * | 9/2018 | B60R 21/00 |

\* cited by examiner

AUTOMATED VALET PARKING SYSTEM

INCORPORATION BY REFERENCE

This application claims priority to Japanese Patent Application No. 2019-221290 filed on Dec. 6, 2019, the contents of which are incorporated herein by reference in its entirety.

BACKGROUND

1. Technical Field

The present disclosure relates to an automated valet parking system.

2. Description of Related Art

Japanese Patent Application Publication No. 2018-21777 has conventionally been known as a technical literature relating to an autonomous vehicle. The literature discloses estimation of the location of an own vehicle as a vehicle location on a map, the estimation being performed by using a relative location of a landmark, imaged with a camera of the vehicle, with respect to the vehicle and location information regarding the landmark on the map.

SUMMARY

When an autonomous vehicle performs automated valet parking, the autonomous vehicle generally uses a vehicle location acquired with an in-vehicle sensor. However, when, for example, a vehicle location error occurs due to an error of the in-vehicle sensor or the like, problems may arise.

One aspect of the present disclosure is an automated valet parking system configured to give an instruction to an autonomous vehicle in a parking place such that the autonomous vehicle drives autonomously along a plurality of passages of the parking place and parks at a target parking space in the parking place. The system includes: a first vehicle location acquisition unit, a second vehicle location acquisition unit; and a location fail determiner. The first vehicle location acquisition unit is configured to acquire, based on a detection result of an in-vehicle sensor of the autonomous vehicle and parking place map information including target information in the parking place, a first vehicle location that is a location of the autonomous vehicle on a parking place map. The second vehicle location acquisition unit is configured to acquire, based on a detection result of a facility sensor provided in the parking place, a second vehicle location that is a location of the autonomous vehicle on the parking place map. The location fail determiner is configured to determine, based on the first vehicle location and the second vehicle location, presence or absence of location fail of the autonomous vehicle with respect to the first vehicle location. The first vehicle location includes a first longitudinal location along an extending direction of the passages, and a first lateral location along a width direction of the passages. The second vehicle location includes a second longitudinal location along the extending direction, and a second lateral location along the width direction. The location fail determiner is configured to determine that the location fail is present at least in one case out of a case where a difference between the first longitudinal location and the second longitudinal location is equal to or greater than a longitudinal threshold and a case where a difference between the first lateral location and the second lateral location is equal to or greater than a lateral threshold. The lateral threshold is smaller than the longitudinal threshold.

The automated valet parking system according to one aspect of the present disclosure is configured to determine that the location fail is present at least in one case out of the case where a difference between the first longitudinal location and the second longitudinal location is equal to or greater than a longitudinal threshold and the case where difference between the first lateral location and the second lateral location is equal to or greater than a lateral threshold. In determination of the location fail, the lateral threshold smaller than the longitudinal threshold is used. Accordingly, it is possible to appropriately determine the location fail regarding the vehicle location with respect to the width direction of the passages, based on the detection result of the in-vehicle sensor of the autonomous vehicle.

In the automated valet parking system according to one aspect of the present disclosure, the parking place map information includes passage width information regarding passage widths of the passages. When the passage width of the passage where the autonomous vehicle travels is equal to or greater than a passage width threshold, the location fail determiner may be configured to determine the presence or absence of the location fail by using the lateral threshold that is larger than when the passage width of the passage where the autonomous vehicle travels is less than the passage width threshold. In this case, the location fail with respect to the lateral location can be determined in accordance with the passage width.

In the automated valet parking system according to one aspect of the present disclosure, the parking place map information may include node location information regarding a plurality of nodes preset such that the nodes are separated from each other at a prescribed interval in accordance with the passages. When the node interval of the nodes, adjacent to each other in the passage where the autonomous vehicle travels, is equal to or greater than a node interval threshold, the location fail determiner may be configured to determine the presence or absence of the location fail by using the longitudinal threshold that is larger than when the node interval is less than the node interval threshold. In this case, the location fail with respect to the longitudinal location can be determined in accordance with the node interval.

In the automated valet parking system according to one aspect of the present disclosure, the parking place map information may further include node location information regarding a plurality of nodes preset such that the nodes are separated from each other at a prescribed interval in accordance with the passages, and node label information regarding types of the nodes. The node label information may include the type of the nodes that are located in a curve section, and the type of the nodes that are located in a straight line section. When the nodes in a vicinity of the traveling autonomous vehicle are located in the curve section, the location fail determiner may be configured to determine the presence or absence of the location fail by using the lateral threshold that is smaller than when the nodes are located in the straight line section. In this case, the location fail regarding the lateral location can be determined in accordance with whether the nodes are located in the straight line section or the nodes are located in the curve section.

The automated valet parking system according to one aspect of the present disclosure can appropriately determine location fail regarding vehicle location with respect to the width direction of the passages, based on the detection result of the in-vehicle sensor of the autonomous vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

Embodiments of the present disclosure will be described below with reference to the drawings.

Figure 1:
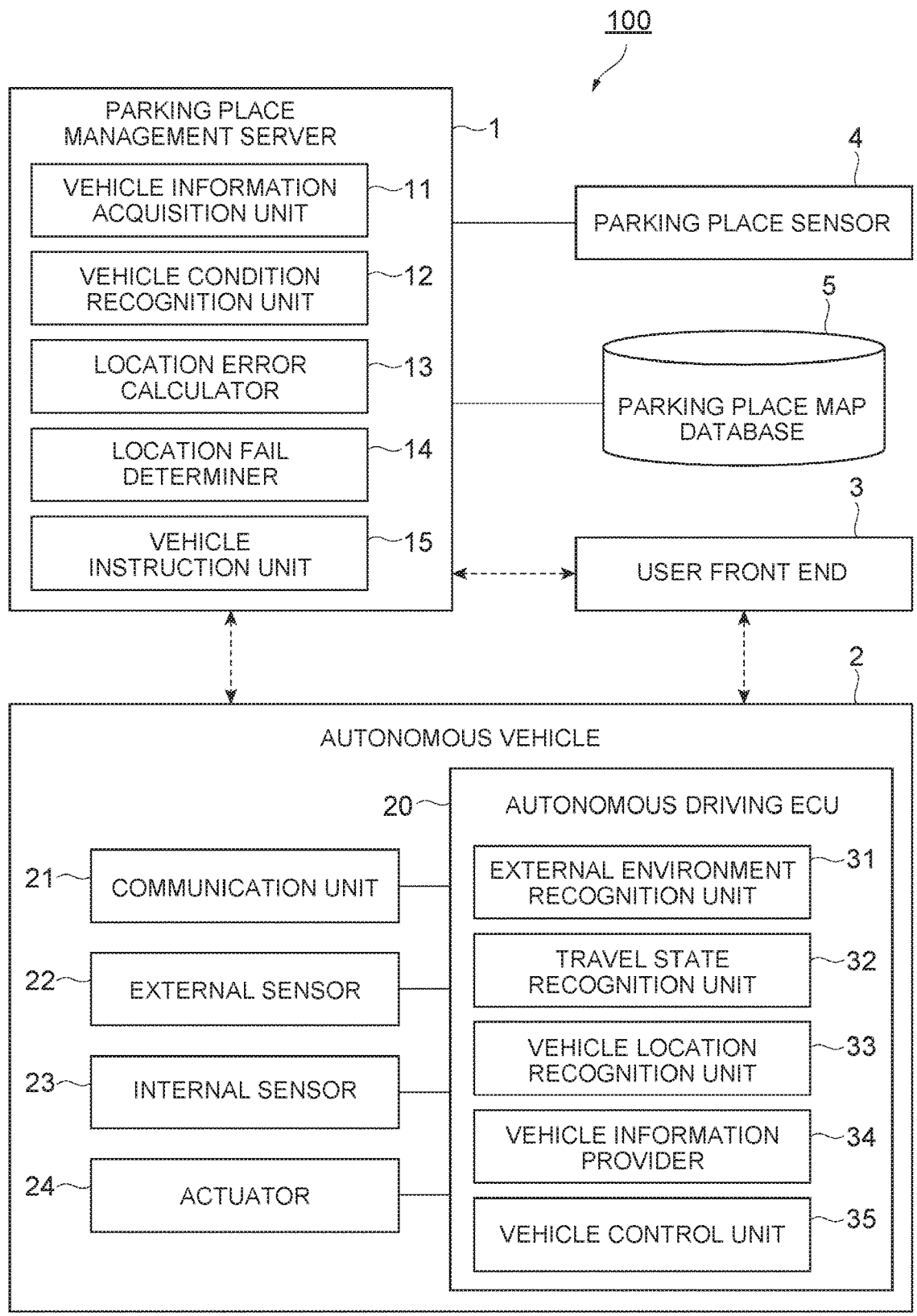
FIG. 1 is a block diagram showing an automated valet parking system according to an embodiment.

FIG. 1 is a block diagram showing an automated valet parking system 100 according to an embodiment. The automated valet parking system (AVPS) 100 shown in FIG. 1 is a system for performing automated valet parking of an autonomous vehicle 2 in a parking place.

The automated valet parking is a service that controls an unmanned autonomous vehicle 2 after a user or users (occupants) of the autonomous vehicle 2 get down at a drop-off area of a parking place. In response to an instruction from the parking place side, the unmanned autonomous vehicle 2 is made to travel along a target route and to autonomously park at a target parking space in the parking place. The target parking space is a parking space preset as a parking location of the autonomous vehicle 2. The target route is a route in the parking place along which the autonomous vehicle 2 travels to reach the target parking space. A target route at the time of pick-up is a travel route to reach a pick-up space described later.

The parking place may be a parking place exclusive for automated valet parking, or may be a parking place that also accepts general vehicles which do not support automated valet parking. A parking place for general vehicles may partially be used as an area exclusive for automated valet parking. In the present embodiment, the parking place exclusive for automated valet parking will be described as an example.

Figure 2:
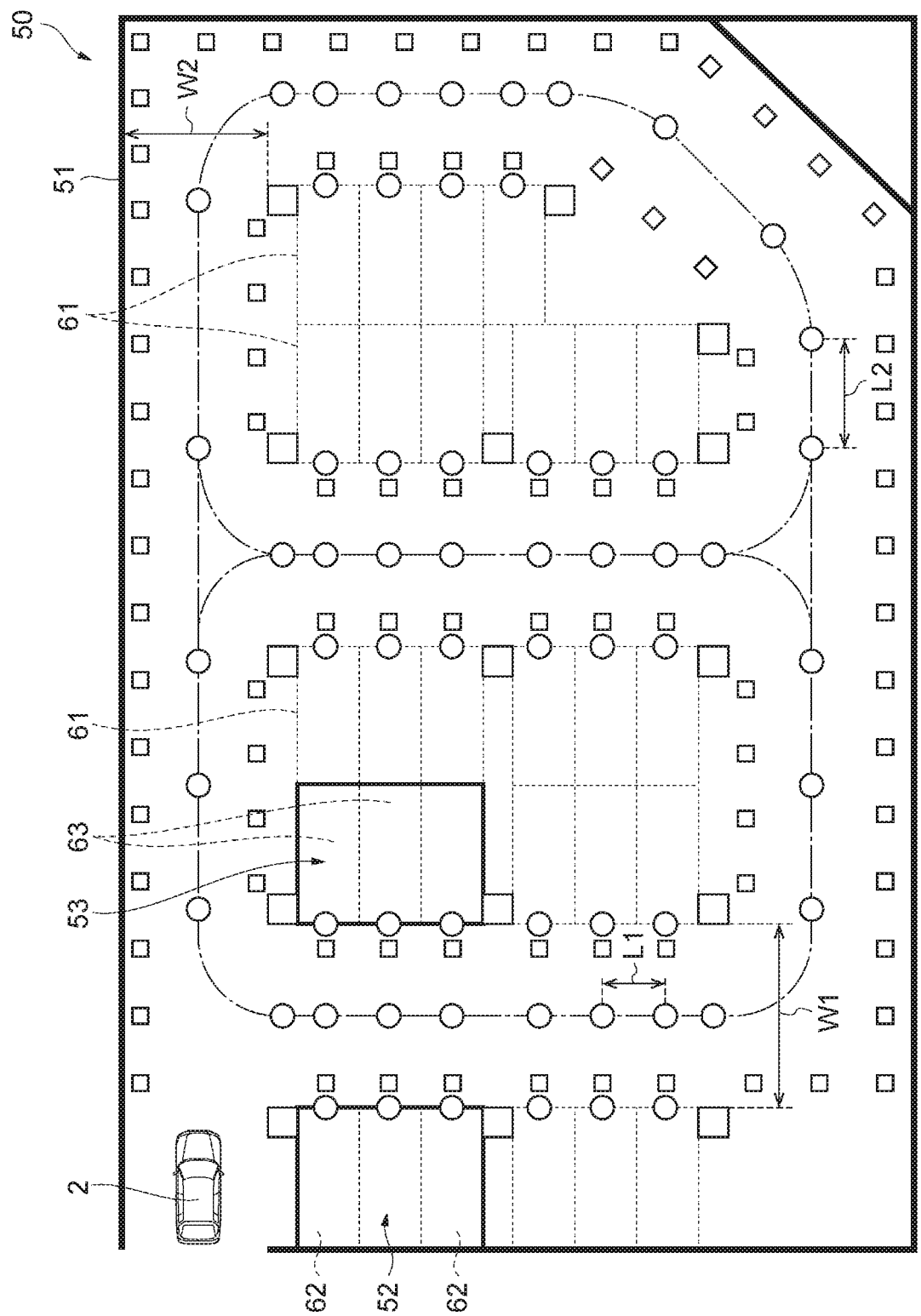
FIG. 2 is a plan view showing an example of a parking place where automated valet parking is performed.

Here, FIG. 2 is a plan view showing an example of a parking place where automated valet parking is performed. FIG. 2 shows a parking place 50 for automated valet parking, a parking area 51, a drop-off area 52, and a pick-up area 53. The parking place 50 includes the parking area 51, the drop-off area 52, and the pick-up area 53. The drop-off area 52 and the pick-up area 53 do not need to be provided independently. Instead, they may be provided as an integrated drop-off and pick-up area.

The parking area 51 is a place where parking spaces (parking frames) 61 are formed for the autonomous vehicle 2 to park by automated valet parking. For example, the parking spaces 61 are formed side by side in one direction (direction of vehicle widths of parked vehicles) as shown in FIG. 2. The drop-off area 52 is a place provided in the vicinity of a gateway of the parking place 50 for occupants including a user to get off the autonomous vehicle 2 before depositing the autonomous vehicle 2. In the drop-off area 52, drop-off spaces 62 are formed for the autonomous vehicle 2 to stop for the occupants to get off the vehicle.

The pick-up area 53 is a place provided in the vicinity of the gateway of the parking place 50 for the occupants to get on the autonomous vehicle 2 which has left the parking space for pick-up. In the pick-up area 53, pick-up spaces 63 are formed for the autonomous vehicle 2 to wait for the occupants to get on the vehicle.

For example, after the autonomous vehicle 2 enters the parking place 50, and drops off the occupants at the drop-off space 62, the automated valet parking system 100 gains authority to instruct the autonomous vehicle 2, and starts automated valet parking. The automated valet parking system 100 controls the autonomous vehicle 2 to travel toward a target parking space in the parking area 51, and controls the autonomous vehicle 2 to park at the target parking space. In response to a pick-up request, the automated valet parking system 100 controls the autonomous vehicle 2 during parking to travel toward the pick-up area 53 and wait for arrival of the occupants at the pick-up space 63.

While the autonomous vehicle 2 is made to travel toward the target parking space in the parking area 51 and while the autonomous vehicle 2 is made to travel toward the pick-up area 53 during execution of automated valet parking, the automated valet parking system 100 determines the presence or absence of location fail of the autonomous vehicle 2, based on the detection result of an in-vehicle sensor of the autonomous vehicle 2 and the detection result of a parking place sensor (facility sensor) 4 provided in the parking place 50.

Configuration of Automated Valet Parking System

The configuration of the automated valet parking system 100 will be described below with reference to the drawings. As shown in FIG. 1, the automated valet parking system 100 includes a parking place management server 1. The parking place management server 1 is a server for managing the parking place.

The parking place management server 1 is configured so as to be communicable with the autonomous vehicle 2 and with a user front end 3. The autonomous vehicle 2 and the user front end 3 will be described later in detail. The parking place management server 1 may be provided in the parking place, or may be provided in a facility away from the parking place. The parking place management server 1 may be constituted of a plurality of computers provided in different places.

The parking place management server 1 is connected with a parking place sensor 4 and a parking place map database 5. The parking place sensor 4 is a parking place facility sensor (infrastructure sensor) provided in the parking place 50 in order to recognize the situation in the parking place 50. The parking place sensor 4 includes an empty sensor for detecting whether parked vehicles are present in the parking spaces (whether the parking spaces are occupied or empty).

The empty sensor may be provided for every parking space, or may be provided in a ceiling or the like such that one empty sensor can monitor a plurality of parking spaces. The configuration of the empty sensor is not limited in particular, and well-known configuration is adoptable. The empty sensor may be a pressure sensor, may be a radar sensor or a sonar sensor using an electric wave, or may be a camera. The empty sensor transmits the detection information on the vehicles parked in the parking space to the parking place management server 1.

The parking place sensor 4 may include a monitoring camera for detecting the autonomous vehicle 2 that travels on a traveling road of the parking place 50. The monitoring camera is provided in the ceiling or a wall of the parking place 50 to image the traveling autonomous vehicle 2. The monitoring camera transmits an imaged image to the parking place management server 1.

The parking place sensor 4 includes a vehicle location detection sensor for acquiring the location of the autonomous vehicle 2 on the parking place map. The vehicle location detection sensor includes at least one of a camera and a radar sensor. The camera is an imaging device that images the autonomous vehicle 2 in the parking place 50. For example, a plurality of cameras are provided on the ceiling or walls of the parking place 50 to image the traveling autonomous vehicle 2 such that the location of the autonomous vehicle 2 in the parking place 50 can be acquired. The cameras may be substituted by the monitoring cameras. The cameras transmit an imaged image to the parking place management server 1. The radar sensor is a detector that detects the autonomous vehicle 2 with use of electric waves (such as millimeter waves) or light. The radar sensor includes, for example, a millimeter-wave radar. The radar sensor detects the autonomous vehicle 2 by transmitting an electric wave or light to the passages of the parking place 50 and receiving the electric wave or light reflected by the autonomous vehicle 2. The radar sensor transmits the detected information on the autonomous vehicle 2 to the parking place management server 1. The radar sensor may include a light detection ranging (LIDAR).

The parking place map database 5 is a database that stores parking place map information. The parking place map information includes location information regarding parking spaces in the parking place, location information regarding the drop-off space, location information regarding the pick-up space, and information on the traveling roads in the parking place. The parking place map information also includes node location information regarding a plurality of nodes preset according to a plurality of passages in the parking place, location information regarding driving boundaries used for autonomous driving of the autonomous vehicle 2, and location information (target information) regarding landmarks (targets) used by the autonomous vehicle 2 for location recognition.

The driving boundary herein refers to an object that can define the range in which the autonomous vehicle 2 can travel by autonomous driving. As the driving boundary, a location on an object fixedly provided in the parking place 50 can be used. Examples of the driving boundary may include a boundary (for example, a curbstone, a white line, etc.) between the passage where the autonomous vehicle 2 travels and a sidewalk. For example, at least one location out of a prescribed location (for example, a summit) on the surface of a pillar of the parking place 50, a prescribed location on the wall surface of the parking place 50, an installation location of a pole, an installation location of a traffic cone, an installation location of a road surface rivet, and the like, may be used as the driving boundary. The landmark refers to an object used as a basis of a relative location used for recognizing the location of the autonomous vehicle 2 in the parking place 50. As the landmark, an object fixedly provided in the parking place 50 can be used. As the landmark, at least one of a pillar of the parking place 50, a wall of the parking place 50, a pole, a traffic cone, a road surface rivet and the like is used, for example.

The parking place map information may include node location information regarding a plurality of nodes preset such that the nodes are separated from each other at a prescribed interval in accordance with a plurality of passages in the parking place 50. In FIG. 2, the nodes that are preset according to the passages in the parking place 50 are expressed as white circles. In the example of FIG. 2, imaginary lines extending along the passages in the parking place 50 are assumed as shown by a chain line. The nodes are set on the imaginary lines such that the locations of the nodes are separated from each other at a prescribed interval.

For example, in a straight line section of the passage, a pair of nodes is set at endpoints (a start point and an end point) of the straight line section. These nodes are used by the autonomous vehicle 2 to autonomously drive in the straight line section. More nodes may be set in a section interposed between the endpoints of the straight line section of the passage.

In a straight line section of the passage, when an entrance of each parking space 61 faces a section between the endpoints of the straight line section, a node is set in front of each parking space 61, and a node is further set on a frame line corresponding to the entrance of each parking space 61. When the autonomous vehicle 2 performs automated parking at a certain parking space 61, these nodes are used in order to transmit information on the driving boundaries and landmarks around the parking space 61 to the autonomous vehicle 2. More nodes may be set around the parking space 61.

A curve section of the passage is defined by the nodes as the endpoints (endpoints of the curve section) of the straight line sections adjacent to each other across the pertinent curve section. For example, a pair of nodes (nodes corresponding to a start point or an end point of a curve) constituting the endpoints of a curve section of the passage may be redundant with the nodes as the endpoints of the straight line sections adjacent to each other. In the curve sections of the passages, the imaginary lines can be assumed as curve lines connecting these nodes. These nodes are used by the autonomous vehicle 2 to autonomously drive in the curve sections. More nodes may be set in a section (hereinafter, simply referred to as "in a curve section") between the nodes as the end points of the straight line sections adjacent to each other.

The parking place map information further includes node label information regarding the types of nodes. The node label information refers to information applied to every node, with the types of the nodes as labels. The types of the nodes refers to the types of the locations of the nodes in the parking place 50. The types of the nodes includes, for example, a first node type indicating that the pertinent node is located in the vicinity of the parking space, a second node type indicating that the pertinent node is located in the curve section, and a third node type indicating that the pertinent node is located in the straight line section.

The prescribed interval of the node locations is not necessarily constant in the parking place 50, and is preset in accordance with the locations of the nodes. For example, an interval (distance L1 of FIG. 2) of the nodes located in the vicinity of the parking space is shorter than the interval of the nodes located in a curve section or a straight line section that is not located in the vicinity of the parking section. The interval of the nodes located in the curve section may be shorter than the interval of the nodes located in the straight line section. The interval of the nodes located in a curve section having a larger radius of curvature than a prescribed threshold may be equivalent to the interval of the nodes located in the straight line section. An interval (distance L2 of FIG. 2) of the nodes located in the straight line section may approximately be constant in the straight line section. The interval of the nodes located in the vicinity of a boundary with a curve section may be shorter than the interval of the nodes that is not located in the vicinity of the boundary. The "nodes located in the vicinity of the parking space" may refer to any nodes located in the vicinity of the parking space. The nodes may be located in any passages having the shape of a curve or a straight. As for the location of the nodes, the "curve section" refers to the curve section that is not located in the vicinity of the parking space, and the "straight line section" refers to the straight line section that is not located in the vicinity of the parking space. The curve section may also include a section where an advancing direction changes at an intersection.

The parking place map information includes passage width information regarding the passage widths of the passages in the parking place 50. The passage width is not necessarily constant in the parking place 50, and is preset in accordance with arrangement of the driving boundaries of the parking place 50. The passage width can be defined, for example, as a distance on a road surface between a pair of driving boundaries in a direction perpendicular to an imaginary line extending at an approximate center of the passage. The passage width information is preset in accordance with arrangement of the driving boundaries corresponding to the structure of the parking place 50. In FIG. 2, there is illustrated a passage width W1 in the case where a pair of pillars provided at the side of the parking spaces 61 that face each other across the passage serve as driving boundaries. There is also illustrated a passage width W2 in the case where a wall and a pillar that face each other across the passage that is a straight line section serve as driving boundaries. Here, in consideration of cutback operation of the autonomous vehicle 2 in front of the parking space 61, the passage width W1 is larger than the passage width W2 in one example. The curve section may also include a section where an advancing direction changes at an intersection.

Figure 3:
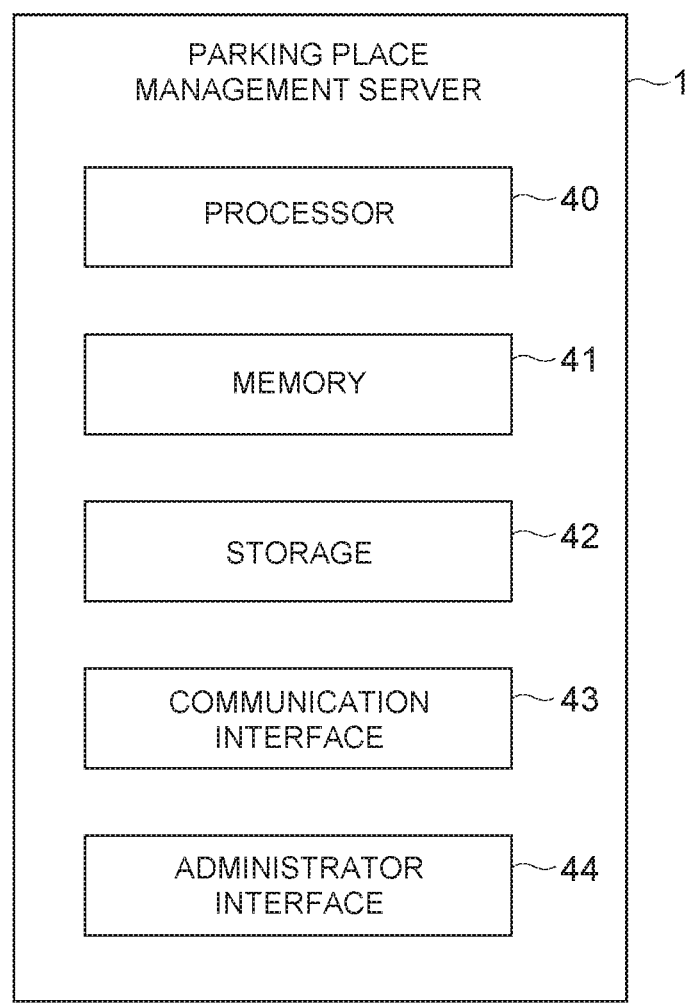
FIG. 3 is a block diagram showing an example of hardware configuration of a parking place management server.

Hardware configuration of the parking place management server 1 will be described. FIG. 3 is a block diagram showing an example of the hardware configuration of the parking place management server 1. As shown in FIG. 3, the parking place management server 1 is constituted as a general computer including a processor 40, a memory 41, a storage 42, a communication interface 43, and an administrator interface 44.

The processor 40 operates various operating systems to control the parking place management server 1. The processor 40 is a computing element, such as a central processing unit (CPU) including a control unit, a computing unit, and a register. The processor 40 collectively controls the memory 41, the storage 42, the communication interface 43, and the administrator interface 44. The memory 41 is a recording medium, such as a read only memory (ROM), and a random access memory (RAM). The storage 42 is a recording medium, such as a hard disk drive (HDD).

The communication interface 43 is a communication device for performing wireless communication through a network. As the communication interface 43, devices such as a network device, a network controller, and a network card, can be used. The parking place management server 1 communicates with the autonomous vehicle 2 and the user front end 3 using the communication interface 43. The administrator interface 44 is an input output unit of the parking place management server 1 for an administrator or the like of the parking place management server 1. The administrator interface 44 includes output devices, such a display and a speaker, and input devices, such as a touch panel.

Next, functional configuration of the parking place management server 1 will be described. As shown in FIG. 1, the parking place management server 1 has a vehicle information acquisition unit (first vehicle location acquisition unit) 11, a vehicle condition recognition unit (second vehicle location acquisition unit) 12, a location error calculator 13, a location fail determiner 14, and a vehicle instruction unit 15.

The vehicle information acquisition unit 11 acquires vehicle information regarding an autonomous vehicle 2 that is a target of automated valet parking through communication with the autonomous vehicle 2. The vehicle information includes identification information regarding the autonomous vehicle 2, and first vehicle location information regarding the autonomous vehicle 2 in the parking place. The first vehicle location information is information about the first vehicle location that is a location of the autonomous vehicle 2 on the parking place map. The location is recognized by the vehicle location recognition unit 33 of the autonomous vehicle 2 based on the detection result of the external sensor 22 of the autonomous vehicle 2. The identification information may be information that can identify each of the autonomous vehicles 2. The identification information may be an identification number (ID), may be a vehicle number, or may be a reservation number or the like of automated valet parking.

The vehicle information may include a vehicle type of the autonomous vehicle 2, or may include a vehicle number different from the identification information. The vehicle information may include deposit reservation information, such as deposit reservation time, or may include estimated pick-up time. The vehicle information may include vehicle body information regarding a turning radius, an overall length, and a vehicle width of the autonomous vehicle 2, and may include information regarding an autonomous driving function of the autonomous vehicle 2. The information regarding the autonomous driving function may include autonomous driving version information.

The vehicle information may include the results of recognizing the travel state and external environments of the autonomous vehicle 2. Recognition of the travel state and the external environments will be described later. The vehicle information may include information on remaining travelable distance or remaining fuel of the autonomous vehicle 2.

The vehicle information acquisition unit 11 continuously acquires vehicle information from the autonomous vehicles 2 during automated valet parking. The vehicle information acquisition unit 11 may continuously acquire, during automated valet parking, the vehicle information from a specific autonomous vehicle 2 that is in autonomous driving in response to an instruction. When another autonomous vehicle 2, different from the specific autonomous vehicle 2, is in autonomous driving in response to an instruction, the vehicle information acquisition unit 11 may continuously acquire the vehicle information from the other autonomous vehicle 2. When the autonomous vehicle 2 is put in a parked state, the vehicle information acquisition unit 11 may interrupt acquisition of the vehicle information, or may periodically acquire the vehicle information.

The vehicle condition recognition unit 12 acquires a second vehicle location that is a location of the autonomous vehicle 2 on the parking place map, based on the detection result of the parking place sensor 4 provided in the parking place 50. The vehicle condition recognition unit 12 acquires the second vehicle location that is a location of the autonomous vehicle 2 on the parking place map, based on the detection result of a vehicle location detection sensor as the parking place sensor 4. The second vehicle location can be acquired with the parking place facility sensor regardless of whether the external sensor 22 of the autonomous vehicle 2 is normal or abnormal. Hence, in the present disclosure, the second vehicle location is used as a basis for calculating an error (location error) of the first vehicle location (described later) that is detected using the external sensor 22 of the autonomous vehicle 2.

The first vehicle location includes a first longitudinal location along an extending direction of the passages, and a first lateral location along a width direction of the passages. For example, the first longitudinal location may be defined as a component of the first vehicle location along an extending direction of an imaginary line (chain line) extending along the passages in the parking place 50 of FIG. 2. For example, the first lateral location may be defined as a component of the first vehicle location along a direction perpendicular to the imaginary line extending at approximately the center of the passages.

The second vehicle location includes a second longitudinal location along the extending direction of the passages, and a second lateral location along the width direction of the passages. For example, the second longitudinal location may be defined as a component of the second vehicle location along the extending direction of the imaginary line extending along the passages in the parking place 50 of FIG. 2. For example, the second lateral location may be defined as a component of the second vehicle location along a direction perpendicular to the imaginary line extending at approximately the center of the passages.

The vehicle condition recognition unit 12 may recognize the situation of the autonomous vehicle 2 in automated valet parking, based on the vehicle information acquired by the vehicle information acquisition unit 11. The situation of the autonomous vehicle 2 includes the vehicle locations of the autonomous vehicles 2 in autonomous driving.

The location error calculator 13 calculates a location error between the first vehicle location acquired by the vehicle information acquisition unit 11 and the second vehicle location acquired by the vehicle condition recognition unit 12. The location error refers to deviation of the vehicle location of the autonomous vehicle 2 used for determination of location fail of the autonomous vehicle 2. The location error herein includes a longitudinal location error along the extending direction of the passages and a lateral location error along the width direction of the passages. The location error calculator 13 calculates, based on the acquired first vehicle location and second vehicle location, the longitudinal location error that is a difference between the first longitudinal location and the second longitudinal location along the extending direction of the passages, and the lateral location error that is a difference between the first lateral location and the second lateral location along the width direction of the passages.

The location fail determiner 14 determines the presence or absence of the location fail based on the first vehicle location and the second vehicle location. The location fail refers to a recognition fault of the vehicle location of the autonomous vehicle 2 with respect to the first vehicle location based on the detection result of the external sensor 22. The location fail may occur due to, for example, a failure of the external sensor 22, a detection failure caused by the external sensor 22 being physically covered with foreign materials or the like, a detection failure caused by landmarks being physically covered with dirt or the like, a communication error of the external sensor 22 to the autonomous driving ECU 20, or the like.

The location fail determiner 14 sets a determination threshold for determining the presence or absence of the location fail. The determination threshold herein includes a longitudinal threshold used for the longitudinal location error and a lateral threshold used for the lateral location error.

In the present disclosure, the lateral threshold is smaller than the longitudinal threshold. For example, when the autonomous vehicle 2 parks by moving back so as to enter in a parking space from the rear side of the vehicle, the autonomous vehicle 2 may perform cutback operation before parking. When the autonomous vehicle 2 approaches a target parking space, an instruction to pull over so as to approach the parking frame of the target parking space is given to the autonomous vehicle 2 as an action of the cutback operation. The action of pulling over is performed for smooth cutback operation and for allowing the external sensor 22 of the autonomous vehicle 2 to more reliably detect the parking frame of the target parking space. Thus, it is important to prepare for pulling over that may involve reduced distance to other parked vehicles, or to reduce lateral displacement of the autonomous vehicle 2 with respect to the parking frame in the parking space 61. Accordingly, when the lateral threshold is set to be smaller than the longitudinal threshold, detection sensitivity of the location fail with respect to the lateral location is enhanced. Hence, an increase in lateral location error in estimation of the location of the own autonomous vehicle 2 can be detected early. This applies to the case where the autonomous vehicle 2 parks by moving back so as to enter into the drop-off space 62 or the pick-up space 63 from the rear side of the vehicle.

When the passage where the autonomous vehicle 2 travels has a passage width equal to or greater than the passage width threshold, the location fail determiner 14 may determine the presence or absence of location fail using a lateral threshold that is larger than when the passage where the autonomous vehicle 2 travels has a passage width less than the passage width threshold. The passage width threshold is a threshold for changing the lateral threshold in accordance with the passage width of the passage where the autonomous vehicle 2 travels. For example, the location fail determiner 14 determines whether or not the passage width of the passage where the autonomous vehicle 2 travels is equal to or greater than the passage width threshold. When determining that the passage width of the passage where the autonomous vehicle 2 travels is equal to or greater than the passage width threshold, the location fail determiner 14 sets a lateral threshold ThLT1 as the lateral threshold. When determining that the passage width of the passage where the autonomous vehicle 2 travels is not equal to or greater than the passage width threshold, the location fail determiner 14 sets a lateral threshold ThLT2 as the lateral threshold.

The lateral threshold ThLT1 is larger than the lateral threshold ThLT2. The size of the passage width corresponds to a distance between the driving boundaries located on the right and left sides in the width direction of the autonomous vehicle 2. Accordingly, when the passage width is small, the distance between the autonomous vehicle 2 and the driving boundaries tends to be narrow. To cope with this tendency, the lateral threshold ThLT2 is set to be smaller than the lateral threshold ThLT1. As a result, the detection sensitivity of the location fail with respect to the lateral location can be enhanced, and the possibility of coming into contact with the driving boundaries can be reduced.

When the type of the nodes in the vicinity of the traveling autonomous vehicle 2 is a second node type (when the traveling autonomous vehicle 2 is located in the vicinity of the parking space), the location fail determiner 14 sets a lateral threshold ThLT3 as the lateral threshold. When the type of the nodes in the vicinity of the traveling autonomous vehicle 2 is a second node type (when the traveling autonomous vehicle 2 is located in the curve section), the location fail determiner 14 sets a lateral threshold ThLT4 as the lateral threshold. When the type of the nodes in the vicinity of the traveling autonomous vehicle 2 is a third node type (when the traveling autonomous vehicle 2 is located in the straight line section), the location fail determiner 14 sets a lateral threshold ThLT5 as the lateral threshold.

The lateral threshold ThLT3 is smaller than the lateral threshold ThLT4. As described before, in the vicinity of the parking space, it is important to prepare for pulling over that may involve reduced distances to other parked vehicles, or to reduce the lateral displacement of the autonomous vehicle 2 with respect to the parking frame in the parking space 61. Accordingly, when the lateral threshold ThLT3 is set to be smaller than the lateral threshold ThLT4, detection sensitivity of the location fail with respect to the lateral location is enhanced. Hence, an increase in lateral location error in estimation of the location of the own autonomous vehicle 2 can be detected early.

The lateral threshold ThLT4 is smaller than the lateral threshold ThLT5. In the curve section, unlike the straight line section, an inner wheel difference may be generated when the autonomous vehicle 2 travels. Accordingly, in the curve section, the distance between the driving boundaries located on the side of the curvature center of the curve and the autonomous vehicle 2 tends to be narrower on the front side of the vehicle than on the rear side of the vehicle. To cope with this tendency, the lateral threshold ThLT4 is set to be smaller than the lateral threshold ThLT5, which can enhance the detection sensitivity of the location fail with respect to the lateral location, and can reduce the possibility of contact with the driving boundaries.

When a node interval between the nodes, adjacent to each other on the passage where the autonomous vehicle 2 travels, is equal to or greater than a node interval threshold, the location fail determiner 14 may determine the presence or absence of location fail using a longitudinal threshold that is larger than when the node interval is less than the node interval threshold. The node interval threshold is a threshold for changing the longitudinal threshold in accordance with the node interval of the nodes adjacent to each other in the passage where the autonomous vehicle 2 travels. For example, the location fail determiner 14 determines whether or not the node interval of the nodes, adjacent to each other in the passage where the autonomous vehicle 2 travels, is equal to or greater than the node interval threshold. When determining that the node interval of the nodes, adjacent to each other in the passage where the autonomous vehicle 2 travels, is equal to or greater than the node interval threshold, the location fail determiner 14 sets a longitudinal threshold ThLN1 as the longitudinal threshold. When determining that the node interval of the nodes, adjacent to each other in the passage where the autonomous vehicle 2 travels, is not equal to or greater than the node interval threshold, the location fail determiner 14 sets a longitudinal threshold ThLN2 as the longitudinal threshold.

The longitudinal threshold ThLN1 is larger than the longitudinal threshold ThLN2. Generally, the size of the node interval corresponds to a distance in the vehicle traveling direction in which the parking place management server 1 can control the autonomous vehicle 2. Accordingly, when the node interval is small, an inter-vehicle distance between the autonomous vehicles 2 that are adjacent to each other tends to be smaller. Accordingly, the longitudinal threshold ThLN2 is set to be smaller than the longitudinal threshold ThLN1, which makes it possible to enhance the detection sensitivity of the location fail with respect to the longitudinal location, and to restrain contact between the autonomous vehicles 2. The node interval is not limited to the interval in the direction along the imaginary line of FIG. 2. A concentric circular distance from the location of the nodes in the vicinity of the autonomous vehicle 2 may be used.

The location fail determiner 14 determines that the location fail is present when a difference between the first longitudinal location and the second longitudinal location (longitudinal location error) is equal to or greater than the longitudinal threshold, or when a difference between the first lateral location and the second lateral location (lateral location error) is equal to or greater than the lateral threshold.

In one example, the location fail determiner 14 determines whether or not the longitudinal location error is equal to or greater than the longitudinal threshold. The location fail determiner 14 determines whether or not the lateral location error is equal to or greater than the lateral threshold. The location fail determiner 14 determines that the location fail is present, when determining that the longitudinal location error is equal to or greater than the longitudinal threshold or when determining that the lateral location error is equal to or greater than the lateral threshold. Meanwhile, the location fail determiner 14 determines that the location fail is not present, when determining that the longitudinal location error is not equal to or greater than the longitudinal threshold and when determining that the lateral location error is not equal to or greater than the lateral threshold.

The vehicle instruction unit 15 gives an instruction to the autonomous vehicle 2 that performs automated valet parking. When the autonomous vehicle 2 starts automated valet parking, the vehicle instruction unit 15 instructs to the autonomous vehicle 2 a target route toward a target parking space of the autonomous vehicle 2. How to determine the target parking space is not limited in particular. The vehicles that enter the parking place earlier may be allocated to parking spaces closer to an exit side, or the vehicles having earlier pick-up reservation time may be allocated to the parking spaces closer to the exit side. Users may be allowed to specify the target parking spaces. The vehicle instruction unit 15 may not need to instruct the entire target route, from the current location of the autonomous vehicle 2 to the target parking space, at once. Instead, the vehicle instruction unit 15 may be configured to instruct some parts of the target route. The vehicle instruction unit 15 instructs the target route for reaching the pick-up space 63 when the autonomous vehicle 2 leaves the parking space for pick-up.

The vehicle instruction unit 15 calculates the target route from the location of the autonomous vehicle 2 to the target parking space, based on the vehicle location acquired by the vehicle information acquisition unit 11 of the autonomous vehicle 2 in autonomous driving in accordance with an instruction. For example, the vehicle instruction unit 15 calculates, as a target route, a route that allows the autonomous vehicle 2 to reach the target parking space with a shortest travel distance along a traveling road in the parking place. The vehicle instruction unit 15 may calculate a new target route of the autonomous vehicle 2 such that the target route does not cross the target routes of other autonomous vehicles 2. The vehicle instruction unit 15 may determine the target parking space in consideration of the target route. The vehicle instruction unit 15 may instruct an upper-limit vehicle speed in the parking place together with the target route. The vehicle instruction unit 15 may instruct an upper-limit acceleration. The upper-limit vehicle speed and the upper-limit acceleration are determined in advance.

The vehicle instruction unit 15 gives a stop instruction and an advance instruction in accordance with the situation of other autonomous vehicles 2 recognized by the vehicle condition recognition unit 12. The stop instruction is an instruction to stop the autonomous vehicle 2. The advance instruction is an instruction to advance (start) the stopped autonomous vehicle 2. The vehicle instruction unit 15 may instruct deceleration or acceleration of the autonomous vehicle 2. The vehicle instruction unit 15 controls stop and advance of the autonomous vehicle 2 in accordance with the situation of other autonomous vehicles 2 such that the autonomous vehicle 2 travels to the target parking space while avoiding approach to other autonomous vehicles 2.

The vehicle instruction unit 15 may instruct the autonomous vehicle 2 to stop, when the location fail determiner 14 determines that location fail is present. The vehicle instruction unit 15 may instruct the autonomous vehicle 2 to decelerate, when the location fail determiner 14 determines that location fail is present. The vehicle instruction unit 15 may permit the autonomous vehicle 2 to advance, when the location fail determiner 14 determines that location fail is not present. The vehicle instruction unit 15 may permit acceleration of the autonomous vehicle 2, when the location fail determiner 14 determines that location fail is not present.

When the location fail determiner 14 determines that location fail is present in the case where a LIDAR is installed at a prescribed location of the parking place 50 as the parking place sensor 4, the vehicle instruction unit 15 may instruct the autonomous vehicle 2 to move to an area in the vicinity of the installation location of the LIDAR. In this case, the detection result of the external sensor 22 (location information regarding the landmarks) that has caused the location fail may be corrected using the detection result of the LIDAR as the parking place sensor 4. As a result, the result of the own vehicle location estimation by the vehicle location recognition unit 33 of the autonomous vehicle 2 can be corrected. With use of the detection result of the empty sensor provided for every parking frame of the parking space 61, the location information detected by the empty sensor may be transmitted to the autonomous vehicle 2 located in the vicinity of the parking space 61. As a result, the result of the own vehicle location estimation by the vehicle location recognition unit 33 of the autonomous vehicle 2 can also be corrected.

Description is now given of the autonomous vehicle 2 and the user front end 3 that communicate with the parking place management server 1. The automated valet parking system 100 according to the present embodiment may not need to include the autonomous vehicle 2 and the user front end 3.

As shown in FIG. 1, the autonomous vehicle 2 has the autonomous driving ECU 20 in one example. The autonomous driving ECU 20 is an electronic control unit including a CPU, a ROM, and a RAM. In the autonomous driving ECU 20, various kinds of functions are implemented by loading the programs recorded on the ROM to the RAM and executing the programs loaded to the RAM on the CPU, for example. The autonomous driving ECU 20 may be constituted of a plurality of electronic units.

The autonomous driving ECU 20 is connected with a communication unit 21, an external sensor (in-vehicle sensor) 22, an internal sensor 23, and an actuator 24.

The communication unit 21 is a communication device that controls wireless communication with the outside of the autonomous vehicle 2. The communication unit 21 performs transmission and reception of various pieces of information through communication with the parking place management server 1. For example, the communication unit 21 transmits the vehicle information to the parking place management server 1, and acquires information (for example, information on the landmarks along the target route) necessary for automated valet parking from the parking place management server 1. The communication unit 21 also communicates with the user front end 3 associated with the autonomous vehicle 2.

The external sensor 22 is an in-vehicle sensor that detects the external environments of the autonomous vehicle 2. The external sensor 22 includes at least an in-vehicle camera. The in-vehicle camera is an imaging device that images the external environments of the autonomous vehicle 2. The in-vehicle camera is provided, for example, on the other side of a windshield glass of the autonomous vehicle 2 to image an area in front of the vehicle. The in-vehicle camera transmits imaging information regarding the external environments of the autonomous vehicle 2 to the autonomous driving ECU 20. The in-vehicle camera may be a monocular camera or may be a stereoscopic camera. A plurality of in-vehicle cameras may be provided to image areas on the right and left sides of the autonomous vehicle 2 and an area behind the autonomous vehicle 2, in addition to the area in front of the autonomous vehicle 2.

The external sensor 22 may include an in-vehicle radar sensor. The in-vehicle radar sensor detects an object by transmitting an electric wave or light to the periphery of the autonomous vehicle 2 and receiving the electric wave or light reflected by the object. The in-vehicle radar sensor includes, for example, a millimeter-wave radar or a LIDAR. The in-vehicle radar sensor transmits the detected object information to the autonomous driving ECU 20. The external sensor 22 may also include a sonar sensor that detects the sound outside the autonomous vehicle 2.

The internal sensor 23 is an in-vehicle sensor that detects the travel state of the autonomous vehicle 2. The internal sensor 23 includes a vehicle speed sensor, an acceleration sensor, and a yaw rate sensor. The vehicle speed sensor is a detector that detects the speed of the autonomous vehicle 2. As the vehicle speed sensor, wheel speed sensors can be used. The wheel speed sensors are provided on the wheels of the autonomous vehicle 2, a drive shaft that integrally rotates with the wheels, or the like, to detect rotation speed of the wheels. The vehicle speed sensor transmits the detected vehicle speed information (wheel speed information) to the autonomous driving ECU 20.

The acceleration sensor is a detector that detects acceleration of the autonomous vehicle 2. For example, the acceleration sensor includes a longitudinal acceleration sensor that detects the longitudinal acceleration of the autonomous vehicle 2. The acceleration sensor may include a lateral acceleration sensor that detects the lateral acceleration of the autonomous vehicle 2. The acceleration sensor transmits the acceleration information regarding the autonomous vehicle 2 to the autonomous driving ECU 20, for example. The yaw rate sensor is a detector that detects a yaw rate (rotational angular speed) around a vertical axis of the center of gravity of the autonomous vehicle 2. As the yaw rate sensor, a gyro sensor may be used, for example. The yaw rate sensor transmits the detected yaw rate information regarding the autonomous vehicle 2 to the autonomous driving ECU 20.

The actuator 24 is a device used for control of the autonomous vehicle 2. The actuator 24 includes at least a drive actuator, a brake actuator, and a steering actuator. The drive actuator controls a supply amount of air supplied to an engine (throttle opening angle) in response to a control signal from the autonomous driving ECU 20, and thereby controls drive force of the own autonomous vehicle 2. When the autonomous vehicle 2 is a hybrid vehicle, a control signal from the autonomous driving ECU 20 is input into the motor as a power source, in addition to the supply amount of air to the engine, to control the drive force. When the autonomous vehicle 2 is an electric vehicle, a control signal from the autonomous driving ECU 20 is input into the motor as a power source to control the drive force. The motor as a power source in these cases constitutes the actuator 24.

The brake actuator controls a brake system in response to a control signal from the autonomous driving ECU 20 so as to control braking force applied to the wheels of the autonomous vehicle 2. As the brake system, a hydraulic brake system can be used, for example. The steering actuator controls drive of an assist motor that controls a steering torque in an electric power steering system, in response to a control signal from the autonomous driving ECU 20. Thus, the steering actuator controls the steering torque of the autonomous vehicle 2.

Description is now given of an example of the functional configuration of the autonomous driving ECU 20. The autonomous driving ECU 20 has an external environment recognition unit 31, a travel state recognition unit 32, a vehicle location recognition unit 33, a vehicle information provider 34, and a vehicle control unit 35.

The external environment recognition unit 31 recognizes the external environments of the autonomous vehicle 2, based on the detection result of the external sensor 22 (images imaged by the in-vehicle camera or object information detected by the in-vehicle radar sensor). The external environments include relative locations of surrounding objects with respect to the autonomous vehicle 2. The external environments may include relative speeds and moving directions of the surrounding objects with respect to the autonomous vehicle 2. The external environment recognition unit 31 recognizes objects, such as other vehicles, and pillars of the parking place, by pattern matching or the like. The external environment recognition unit 31 may recognize gates of the parking place, the walls, poles, traffic cones and the like of the parking place. The external environment recognition unit 31 may recognize the driving boundaries in the parking place through recognition of white lines.

The travel state recognition unit 32 recognizes the travel state of the autonomous vehicle 2 based on the detection result of the internal sensor 23. The travel state includes the vehicle speed of the autonomous vehicle 2, the acceleration of the autonomous vehicle 2, and the yaw rate of the autonomous vehicle 2. Specifically, the travel state recognition unit 32 recognizes the vehicle speed of the autonomous vehicle 2 based on the vehicle speed information from the vehicle speed sensor. The travel state recognition unit 32 recognizes the acceleration of the autonomous vehicle 2 based on the vehicle speed information from the acceleration sensor. The travel state recognition unit 32 recognizes the direction of the autonomous vehicle 2 based on the yaw rate information from the yaw rate sensor.

The vehicle location recognition unit 33 acquires the first vehicle location that is a location of the autonomous vehicle 2 on the parking place map, based on the detection result of the external sensor 22 of the autonomous vehicle 2 and the parking place map information including the location information regarding the landmarks in the parking place 50. As acquiring the first vehicle location, the vehicle location recognition unit 33 performs localization of the own vehicle location (estimation of the own vehicle location) that is a location of the autonomous vehicle 2 on the parking place map.

The own vehicle location localization herein refers to estimating the location of the own autonomous vehicle 2 on the parking place map using the location information regarding the landmarks on the parking place map. The vehicle location recognition unit 33 detects, with the external sensor 22, the landmarks having locations predetermined on the parking place map, by a well-known method, and uses the detected landmarks for localization of the own vehicle location. For example, the vehicle location recognition unit 33 acquires the first vehicle location by recognizing the relative locations of the landmarks with respect to the autonomous vehicle 2, based on the external environments recognized by the external environment recognition unit 31 and the location information regarding the landmarks acquired from the parking place management server 1 through the communication unit 21.

In addition, the vehicle location recognition unit 33 may recognize the location of the autonomous vehicle 2 by dead reckoning based on the detection result of the internal sensor 23. The vehicle location recognition unit 33 may also recognize the location of the autonomous vehicle 2 through communication with a beacon provided in the parking place.

The vehicle information provider 34 provides the parking place management server 1 with the vehicle information through the communication unit 21. The vehicle information provider 34 provides the parking place management server 1 with the vehicle information including the information on the location of the autonomous vehicle 2 in the parking place recognized by the vehicle location recognition unit 33 every fixed time, for example.

The vehicle control unit 35 executes autonomous driving of the autonomous vehicle 2. In the autonomous driving, the vehicle control unit 35 controls the autonomous vehicle 2 to travel autonomously along the target route instructed from the parking place management server 1. The vehicle control unit 35 generates a trajectory of the autonomous vehicle 2 based on, for example, the target route, the location of the autonomous vehicle 2, the external environments of the autonomous vehicle 2, and the travel state of the autonomous vehicle 2. The trajectory corresponds to a travel plan of the autonomous driving. The trajectory includes a path where the vehicle travels in autonomous driving and a vehicle speed plan in autonomous driving.

The path is a track expected to be formed by travel of the vehicle in autonomous driving on the target route. The path may be defined as data on steering angle change (steering angle plan) of the autonomous vehicle 2 corresponding to the locations on the target route, for example. The locations on the target route are, for example, set longitudinal locations that are set by every prescribed interval (for example, 1 m) in the advancing direction of the target route. The steering angle plan is data on the target steering angle associated with every set longitudinal location.

For example, the vehicle control unit 35 generates a trajectory of passing the center of a traveling road in the parking place along the target route. When the upper-limit vehicle speed is instructed from the parking place management server 1, the vehicle control unit 35 generates a trajectory such that the vehicle speed plan that does not exceed the upper-limit vehicle speed is produced. The vehicle control unit 35 may generate the trajectory using the parking place map information acquired through communication with the parking place management server 1.

The vehicle control unit 35 stops the autonomous vehicle 2, when a stop instruction is received from the parking place management server 1. The vehicle control unit 35 advances the autonomous vehicle 2 in a stopped state, when an advance instruction is received from the parking place management server 1. For example, the vehicle control unit 35 controls the autonomous vehicle 2 to drive autonomously along the path by executing vehicle longitudinal control and vehicle lateral control. Although examples of the configuration of the autonomous vehicle 2 have been described, the autonomous vehicle 2 is not limited to the described configuration examples as long automated valet parking can be executed.

The user front end 3 is a user's personal digital assistant associated with the autonomous vehicle 2. For example, the user front end 3 is registered in the autonomous vehicle 2 as a terminal of the owner of the autonomous vehicle 2. The user front end 3 may be the terminal of a temporal owner by rental, or the terminal of a user registered in the autonomous vehicle 2 as an authority holder through transfer of instruction authority from the owner. The user front end 3 is constituted of a computer including, for example, a processor such as a CPU, a memory such as a ROM or a RAM, and a user interface including a display integrated with a touch panel, and the like.

The user front end 3 has functions to make a deposit request and a pick-up request to the parking place management server 1. The user can make the deposit request and the pick-up request with respect to automated valet parking by operating the user front end 3. For example, the user gives the authority to instruct the autonomous vehicle 2 to the parking place management server 1 by stopping the autonomous vehicle 2 at the drop-off space 62 in the drop-off area 52 of the parking place 50, getting off the vehicle, and then operating the user front end 3 to complete the deposit request.

By making a pick-up request, the user makes the autonomous vehicle 2 that is parked at the parking space 61 travel to the pick-up space 63 in the pick-up area 53 through the parking place management server 1. The autonomous vehicle 2 waits for the user at the pick-up space 63. The parking place management server 1 terminates the authority to instruct the autonomous vehicle 2 when, for example, the autonomous vehicle 2 arrives at the pick-up space 63 and stops. The instruction authority may be terminated when the user instructs the autonomous vehicle 2 to open the door or to start the vehicle. The instruction authority may be terminated by the autonomous vehicle 2. Operation of the autonomous vehicle 2 relating to the deposit request and the pick-up request is not limited to the aspects described above. This also applies to the parking place management server 1.

Process of Automated Valet Parking System

Figure 4:
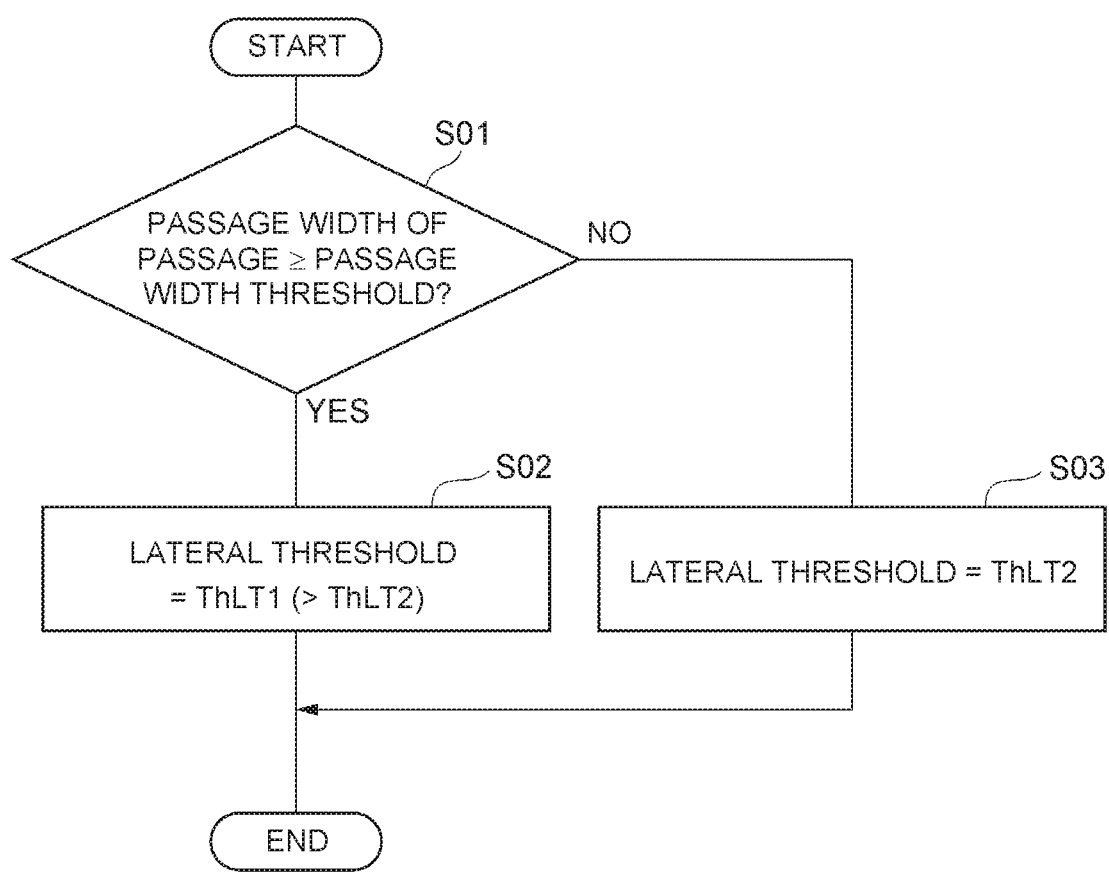
FIG. 4 is a flowchart showing an example of a lateral threshold setting process.

The process of the automated valet parking system 100 will be described below with reference to the drawings. FIG. 4 is a flowchart showing an example of a lateral threshold setting process. The lateral threshold setting process of FIG. 4 is executed after the start of automated valet parking, such as when the autonomous vehicle 2 that is communicable with the parking place management server 1 enters the parking place.

As shown in FIG. 4, in S01, the parking place management server 1 uses the location fail determiner 14 to determine whether or not the passage width of the passage where the autonomous vehicle 2 travels is equal to or greater than a passage width threshold.

When the location fail determiner 14 determines that the passage width of the passage where the autonomous vehicle 2 travels is equal to or greater than the passage width threshold (S01: YES), the parking place management server 1 shifts to S02. When the location fail determiner 14 does not determine that the passage width of the passage where the autonomous vehicle 2 travels is equal to or greater than the passage width threshold (S01: NO), the parking place management server 1 shifts to S03.

In S02, the parking place management server 1 uses the location fail determiner 14 to set, as a lateral threshold, a lateral threshold ThLT1 that is larger than a lateral threshold ThLT2 when the passage width of the passage where the autonomous vehicle 2 travels is less than the passage width threshold. In S03, the parking place management server 1 uses the location fail determiner 14 to set, as the lateral threshold, the lateral threshold ThLT2 that is used when the passage width of the passage where the autonomous vehicle 2 travels is less than the passage width threshold. Then, the parking place management server 1 ends the current process of FIG. 4. Then, the parking place management server 1 repeatedly executes the process of FIG. 4 after the lapse of specified time, for example.

Figure 5:
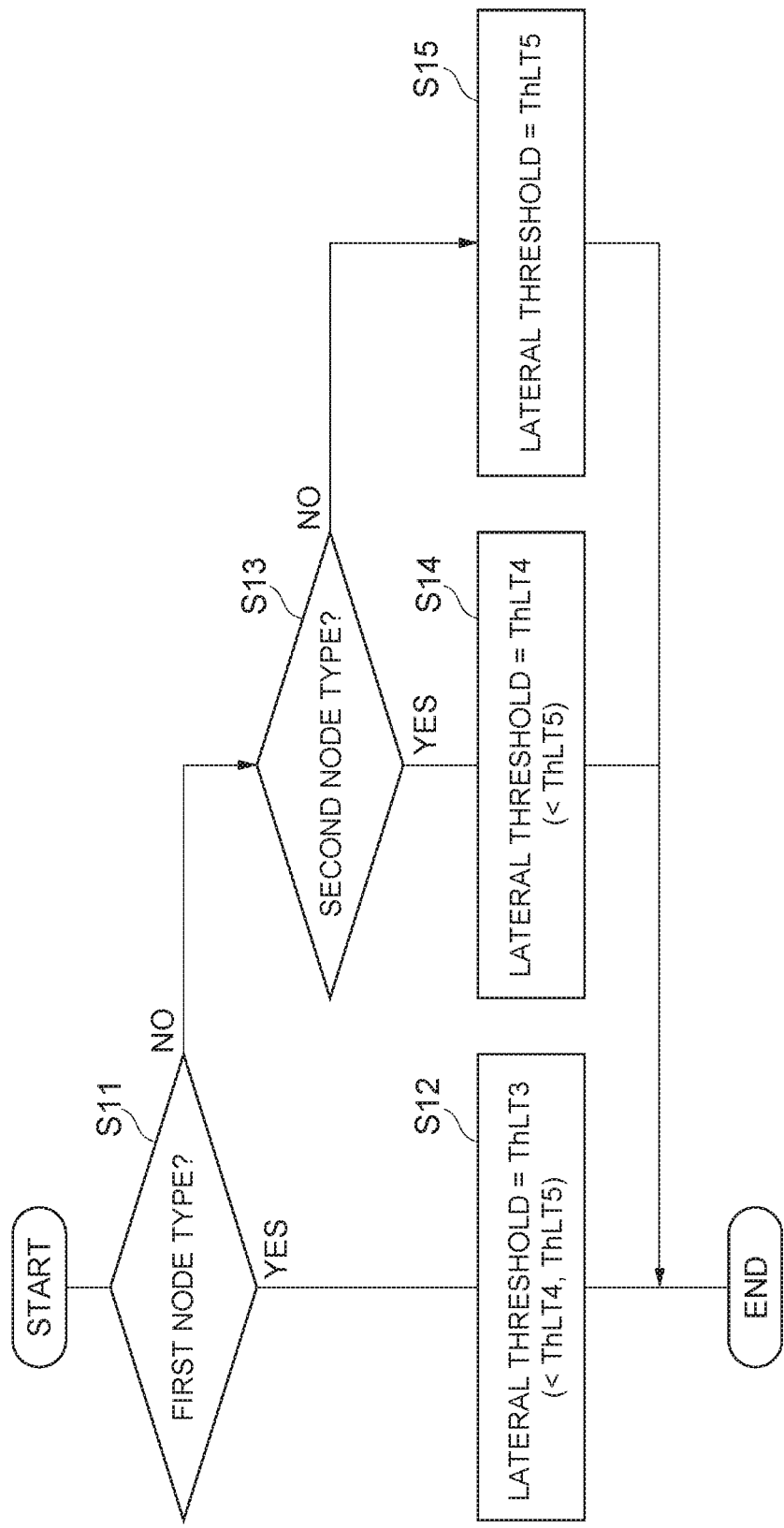
FIG. 5 is a flowchart showing another example of the lateral threshold setting process.

The lateral threshold may be set as shown in FIG. 5. FIG. 5 is a flowchart showing another example of the lateral threshold setting process. The lateral threshold setting process of FIG. 5 is executed after the start of automated valet parking, such as when the autonomous vehicle 2 that is communicable with the parking place management server 1 enters the parking place.

As shown in FIG. 5, in S11, the parking place management server 1 uses the location fail determiner 14 to determine whether or not a node label is the first node type (whether or not the node is located in the vicinity of the parking area). When the location fail determiner 14 determines that the node label is the first node type (S11: YES), the parking place management server 1 shifts to S12. In S12, the parking place management server 1 uses the location fail determiner 14 to set, as the lateral threshold, a lateral threshold ThLT3 that is smaller than lateral thresholds ThLT4, ThLT5 that are used when the node in the vicinity of the traveling autonomous vehicle 2 has a second node type or a third node type. Then the parking place management server 1 ends the current process of FIG. 5. Then, the parking place management server 1 repeatedly executes the process of FIG. 5 after the lapse of specified time, for example.

Meanwhile, the parking place management server 1 shifts to S13, when the location fail determiner 14 determines that the node label is not the first node type (S11: NO). In S13, the parking place management server 1 uses the location fail determiner 14 to determine whether or not the node label is the second node type (whether or not the node is located in the curve section). The parking place management server 1 shifts to S14, when the location fail determiner 14 determines that the node label is the second node type (S13: YES). In S14, the parking place management server 1 uses the location fail determiner 14 to set, as the lateral threshold, the lateral threshold ThLT4 that is smaller than the lateral threshold ThLT5 used when the type of the node in the vicinity of the traveling autonomous vehicle 2 is the third node type. Then the parking place management server 1 ends the current process of FIG. 5. Then, the parking place management server 1 repeatedly executes the process of FIG. 5 after the lapse of specified time, for example.

Meanwhile, the parking place management server 1 shifts to S15, when the location fail determiner 14 determines that the node label is not the second node type (S13: NO). In S15, the parking place management server 1 uses the location fail determiner 14 to set, as the lateral threshold, the lateral threshold ThLT5 that is used when the type of the node in the vicinity of the traveling autonomous vehicle 2 is the third node type. Then, the parking place management server 1 ends the current process of FIG. 5. Then, the parking place management server 1 repeatedly executes the process of FIG. 5 after the lapse of specified time, for example.

Figure 6:
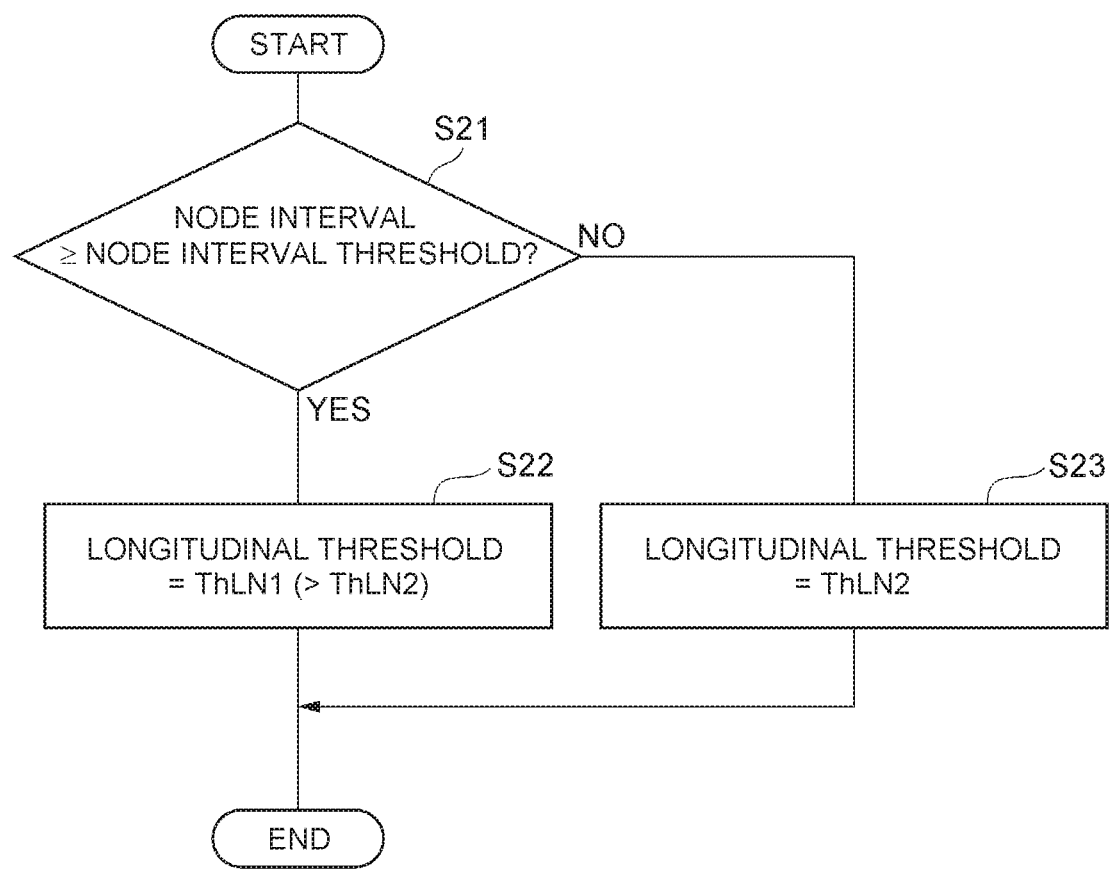
FIG. 6 is a flowchart showing an example of a longitudinal threshold setting process.

As shown in FIG. 6, in S21, the parking place management server 1 uses the location fail determiner 14 to determine whether or not a node interval of the adjacent nodes in the passage where the autonomous vehicle 2 travels is equal to or greater than a node interval threshold.

When the location fail determiner 14 determines that the node interval of the adjacent nodes in the passage where the autonomous vehicle 2 travels is equal to or greater than the node interval threshold (S21: YES), the parking place management server 1 shifts to S22. When the location fail determiner 14 does not determine that the node interval of the adjacent nodes in the passage where the autonomous vehicle 2 travels is equal to or greater than the node interval threshold (S21: NO), the parking place management server 1 shifts to S23.

In S22, the parking place management server 1 uses the location fail determiner 14 to set, as a longitudinal threshold, a longitudinal threshold ThLN1 that is larger than a longitudinal threshold ThLN2 used when the node interval of the adjacent nodes in the passage where the autonomous vehicle 2 travels is less than the node interval threshold. In S23, the parking place management server 1 uses the location fail determiner 14 to set, as the longitudinal threshold, the longitudinal threshold ThLN2 used when the node interval of the adjacent nodes in the passage where the autonomous vehicle 2 travels is less than the node interval threshold. Then, the parking place management server 1 ends the current process of FIG. 6. Then, the parking place management server 1 repeatedly executes the process of FIG. 6 after the lapse of specified time, for example.

Figure 7:
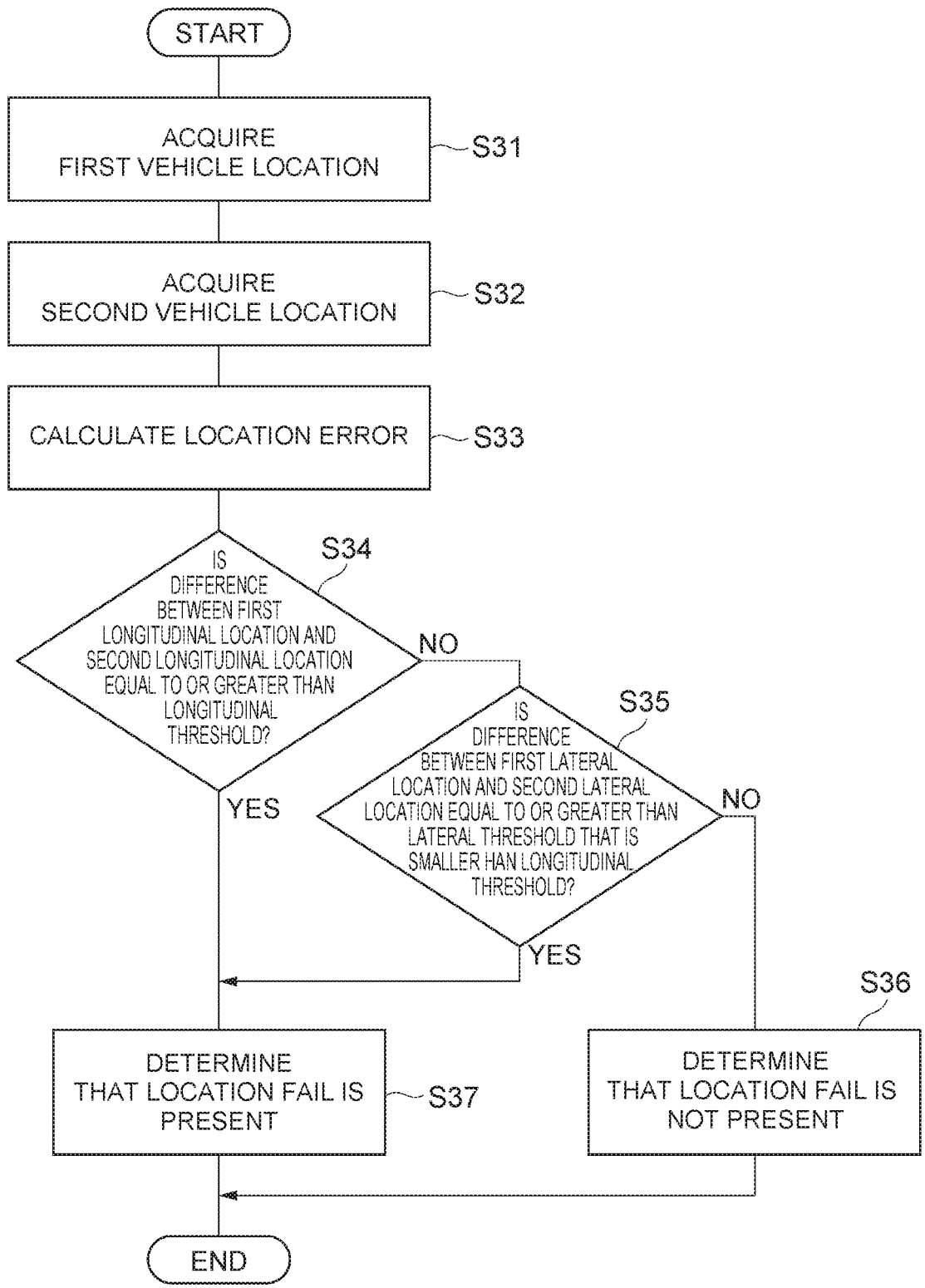
FIG. 7 is a flowchart showing an example of location fail determination process.

FIG. 7 is a flowchart showing an example of the location fail determination process. The location fail determination process is executed after the start of automated valet parking, such as when the autonomous vehicle 2 that is communicable with the parking place management server 1 enters the parking place.

As shown in FIG. 7, the parking place management server 1 uses the vehicle information acquisition unit 11 to acquire a first vehicle location of the autonomous vehicle 2 in S31. The first vehicle location is recognized by the vehicle location recognition unit 33 of the autonomous vehicle 2 based on the detection result of the external sensor 22 of the autonomous vehicle 2 in automated driving in response to an instruction. In S32, the parking place management server 1 uses the vehicle condition recognition unit 12 to acquire a second vehicle location based on the detection result of the parking place sensor 4 provided in the parking place 50. The second vehicle location is a location of the autonomous vehicle 2 on the parking place map.

In S33, the parking place management server 1 uses the location error calculator 13 to calculate a location error between the calculated first vehicle location and second vehicle location. For example, the location error calculator 13 calculates, based on the acquired first vehicle location and second vehicle location, the longitudinal location error that is a difference between the first longitudinal location and second longitudinal location along the extending direction of the passage, and the lateral location error that is a difference between the first lateral location and the second lateral location along the width direction of the passage.

In S34, the parking place management server 1 uses the location fail determiner 14 to determine whether the difference (longitudinal location error) between the first longitudinal location and the second longitudinal location is equal to or greater than a longitudinal threshold.

When the location fail determiner 14 does not determine that the longitudinal location error is equal to or greater than the longitudinal threshold (S34: NO), the parking place management server 1 shifts to S35. In S35, the parking place management server 1 uses the location fail determiner 14 to determine whether or not the difference (lateral location error) between the first lateral location and the second lateral location is equal to or greater than the lateral threshold that is smaller than the longitudinal threshold. When the location fail determiner 14 does not determine that the lateral location error is equal to or greater than the lateral threshold (S35: NO), the parking place management server 1 shifts to S36. In S36, the parking place management server 1 uses the location fail determiner 14 to determine that location fail is not present. Then, the parking place management server 1 ends the current process of FIG. 7. Then, the parking place management server 1 repeatedly executes the process of FIG. 7 after the lapse of specified time, for example.

Meanwhile, the parking place management server 1 shifts to S37, when the location fail determiner 14 determines that the longitudinal location error is equal to or greater than the longitudinal threshold (S34: YES), or when the location fail determiner 14 determines that the lateral location error is equal to or greater than the lateral threshold (S35: YES). In S37, the parking place management server 1 uses the location fail determiner 14 to determine that location fail is present. Then, the parking place management server 1 ends the current process of FIG. 7. Then, the parking place management server 1 repeatedly executes the process of FIG. 7 after the lapse of specified time, for example.

The automated valet parking system 100 according to the present embodiment described in the foregoing determines that the location fail is present when the difference between the first longitudinal location and the second longitudinal location is equal to or greater than the longitudinal threshold and when the difference between the first lateral location and the second lateral location is equal to or greater than the lateral threshold. In determination of the location fail, the lateral threshold (any one of ThLT1 to ThLT5) smaller than the longitudinal threshold (ThLN1 or ThLN2) is used. Hence, location fail of the first vehicle location with respect to the width direction of the passages can appropriately be determined.

In the automated valet parking system 100, the parking place map information includes passage width information regarding the passage width of the passages. When the passage where the autonomous vehicle 2 travels has a passage width equal to or greater than a passage width threshold, the location fail determiner 14 determines the presence or absence of location fail using the lateral threshold ThLT1 that is larger than the lateral threshold ThLT2 used when the passage where the autonomous vehicle 2 travels has a passage width less than the passage width threshold. As a result, the location fail with respect to the lateral location can be determined in accordance with the passage width.

In the automated valet parking system 100, the parking place map information includes node location information regarding a plurality of nodes preset such that the nodes are separated from each other at a prescribed interval in accordance with the passage. When the node interval between the nodes, adjacent to each other on the passage where the autonomous vehicle 2 travels, is equal to or greater than a node interval threshold, the location fail determiner 14 determines the presence or absence of location fail using the longitudinal threshold ThLN1 that is larger than the longitudinal threshold ThLN2 used when the node interval is less than the node interval threshold. As a result, the location fail with respect to the longitudinal location can be determined in accordance with the node interval.

In the automated valet parking system 100, the parking place map information further includes node location information regarding a plurality of nodes preset such that the nodes are separated from each other at a prescribed interval in accordance with the passage, and node label information regarding types of nodes. The node label information includes the type of the nodes that are located in a curve section, and the type of the nodes that are located in a straight line section. When the nodes in the vicinity of the traveling autonomous vehicle 2 are located in the curve section, the location fail determiner 14 determines the presence or absence of the location fail by using the lateral threshold ThLT4 that is smaller than the lateral threshold ThLT5 used when the nodes are located in the straight line section. As a result, the location fail with respect to the lateral location can be determined in accordance with whether the nodes are located in the straight line section or the nodes are located in the curve section.

Although the embodiment of the present disclosure has been described in the foregoing, the present disclosure is not limited to the embodiment disclosed. The present embodiment may be carried out as the embodiment disclosed, as well as in various aspects to which various arrangements and modifications are applied based on the knowledge of those skilled in the art.

The parking place management server 1 may not need to be directly communicable with the autonomous vehicles 2, and the parking place management server 1 may be configured to communicate through other servers. For example, the parking place management server 1 may communicate with the autonomous vehicles 2 through a management server of the manufacturer of the autonomous vehicles 2, a mobility as a service (MaaS) operation server, or the like.

As the types of the nodes, the first node type indicating that the pertinent node is located in the vicinity of the parking space, the second node type indicating that the pertinent node is located in the curve section, and the third node type indicating that the pertinent node is neither located in the vicinity of the parking space nor in the curve section have been illustrated. However, among these three types, one or two types may be omitted, or other types may be further added. Alternatively, the parking place map information may not necessarily need to include the node label information regarding the types of the nodes.

In the embodiment, the parking place map database 5 stores the location information regarding the driving boundaries and the location information regarding the landmarks in association with the nodes as node information in advance. However, the parking place map database 5 may not necessarily need to store such node information. For example, such node information may be obtained from a provider (for example, map data production company, etc.) different from the provider of the parking place map database 5 in such a state that the location information regarding the driving boundaries and the location information regarding the landmarks are associated in advance with the nodes as node information, and be used.

In the embodiment, the lateral thresholds are set by the lateral threshold setting process of FIG. 4 or the lateral threshold setting process of FIG. 5. However, the lateral thresholds may be set by using both the lateral threshold setting process of FIG. 4, and the lateral threshold setting process of FIG. 5. The lateral threshold may not necessarily need to be set in accordance with the passage width and the node types. In the embodiment, the longitudinal thresholds are set by the longitudinal threshold setting process of FIG. 6. However, the longitudinal threshold may not necessarily need to be set in accordance with the node interval. In short, in any case, in the present disclosure, the lateral threshold may be set to be smaller than the longitudinal threshold.

In the embodiment, the location fail determiner 14 determines that the location fail is present when one condition is established, out of a condition that a difference between the first longitudinal location and the second longitudinal location is equal to or greater than the longitudinal threshold and a condition that a difference between the first lateral location and the second lateral location is equal to or greater than the lateral threshold. However, when both the conditions are established, the location fail determiner 14 may determine that the location fail is present. In short, the location fail determiner 14 may determine that the location fail is present at least in one case out of a case where a difference between the first longitudinal location and the second longitudinal location is equal to or greater than the longitudinal threshold and a case where a difference between the first lateral location and the second lateral location is equal to or greater than the lateral threshold.

What is claimed is:

1. An automated valet parking system configured to give an instruction to an autonomous vehicle in a parking place such that the autonomous vehicle drives autonomously along a plurality of passages of the parking place and parks at a target parking space in the parking place, the system comprising:

a first vehicle location acquisition unit configured to acquire, based on a detection result of an in-vehicle sensor of the autonomous vehicle and parking place map information including target information in the parking place, a first vehicle location that is a location of the autonomous vehicle on a parking place map;

a second vehicle location acquisition unit configured to acquire, based on a detection result of a facility sensor located in the parking place and configured to recognize a situation in the parking place, a second vehicle location that is a location of the autonomous vehicle on the parking place map; and a location fail determiner configured to determine, based on the first vehicle location and the second vehicle location, presence or absence of location fail of the autonomous vehicle with respect to the first vehicle location, wherein:

the first vehicle location includes a first longitudinal location along an extending direction of the passages, and a first lateral location along a width direction of the passages;

the second vehicle location includes a second longitudinal location along the extending direction, and a second lateral location along the width direction;

the location fail determiner is configured to determine that the location fail is present at least in one case out of a case where a difference between the first longitudinal location and the second longitudinal location is equal to or greater than a longitudinal threshold and a case where a difference between the first lateral location and the second lateral location is equal to or greater than a lateral threshold; and the lateral threshold is smaller than the longitudinal threshold.

2. The automated valet parking system according to claim 1, wherein:

the parking place map information includes passage width information regarding passage widths of the passages; and when the passage width of the passage where the autonomous vehicle travels is equal to or greater than a passage width threshold, the location fail determiner is configured to determine the presence or absence of the location fail by using the lateral threshold that is larger than when the passage width of the passage where the autonomous vehicle travels is less than the passage width threshold.

3. The automated valet parking system according to claim 1, wherein:

the parking place map information includes node location information regarding a plurality of nodes preset such that the nodes are separated from each other at a prescribed interval in accordance with the passages; and when the node interval of the nodes, adjacent to each other in the passage where the autonomous vehicle travels, is equal to or greater than a node interval threshold, the location fail determiner is configured to determine the presence or absence of the location fail by using the longitudinal threshold that is larger than when the node interval is less than the node interval threshold.

4. The automated valet parking system according to claim 1, wherein:

the parking place map information further includes node location information regarding a plurality of nodes preset such that the nodes are separated from each other at a prescribed interval in accordance with the passages, and node label information regarding types of the nodes;

the node label information includes the type of the nodes that are located in a curve section, and the type of the nodes that are located in a straight line section; and when the nodes in a vicinity of the traveling autonomous vehicle are located in the curve section, the location fail determiner is configured to determine the presence or absence of the location fail by using the lateral threshold that is smaller than when the nodes are located in the straight line section.

5. The automated valet parking system according to claim 1, wherein the facility sensor is configured to detect whether a parking space in the parking place is occupied and/or empty.

6. The automated valet parking system according to claim 1, wherein the facility sensor is configured to detect a location of the autonomous vehicle in the parking place.

* * * * *